G. Meader.
Vibrating Propeller.

No. 52,308. Patented Jan. 30, 1866.

Witnesses,

Inventor,
Geo. Meader
By Munn & Co,
Attys.

UNITED STATES PATENT OFFICE.

GEORGE MEADER, OF OTTAWA, ILLINOIS.

PROPELLER.

Specification forming part of Letters Patent No. 52,308, dated January 30, 1866.

*To all whom it may concern:*

Be it known that I, GEORGE MEADER, of Ottawa, in the county of La Salle and State of Illinois, have invented new and useful Improvements in Propellers; and I do hereby declare that the following is a full, clear, and exact description thereof, which will enable others skilled in the art to make and use the same, reference being had to the accompanying drawings, forming part of this specification.

The present invention consists in a new mode of hanging the paddles, whereby a peculiar movement is imparted to them, and also in the complete control which is had over the arrangement of devices for reversing the paddles.

Figure 1:
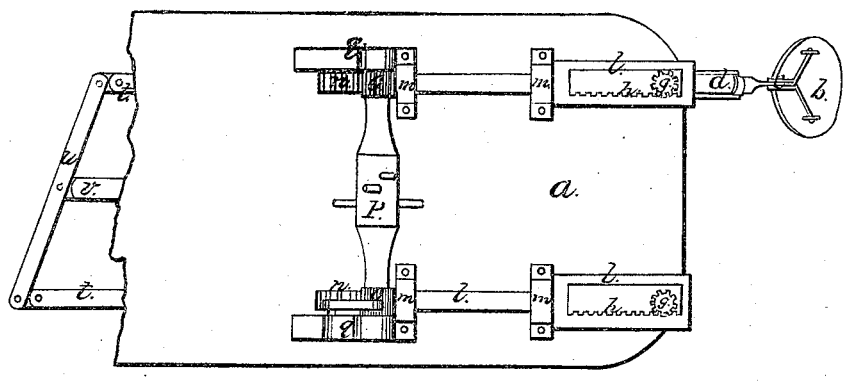
Figure 3:
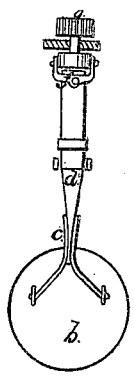
Figure 2:
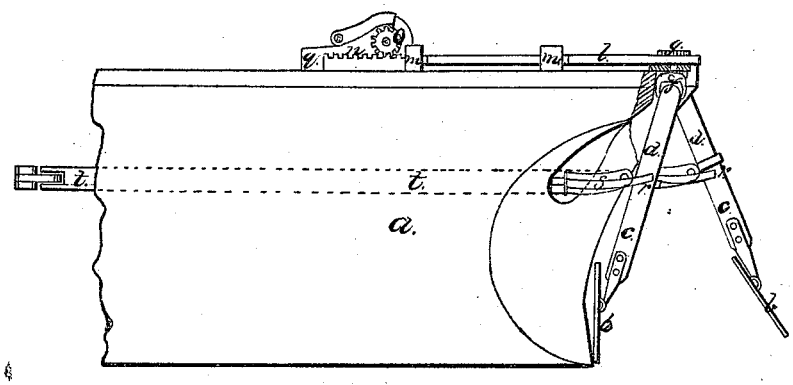

In the accompanying plate of drawings my improvements are illustrated, Figure 1 being a plan or top view of a portion of a vessel, showing my improved arrangement of paddle-wheels; Fig. 2, a side view of Fig. 1; and Fig. 3, a detail view, to be hereinafter referred to.

$a$ $a$ in the drawings represent the stern portion of a vessel having a paddle, $b$ $b$, upon each side thereof arranged according to my improvements. These paddles are made of a circular or any other suitable shape, and each hung to the lower end, $c$, of swinging lever-rods $d$ $d$, attached, by a universal joint, $f$, to a pinion-wheel, $g$, gearing and interlocking with the toothed surface $h$ of the horizontal sliding bar $l$, moving and traveling in suitable guides $m$ $m$ of the vessel. With the ends $n$ of the bars $l$, pinion $o$ $o$ of a cross-beam rod, $p$, of the vessel turning at each end in standards $q$ $q$ of the same.

At the point $r$, between the paddle and the end of the rod $d$, by which it is hung or attached to the pinion $g$, the said rod is attached through a link-piece, $s$, with a horizontal actuating-rod, $t$, moving in suitable guides of the vessel, the inner ends of which rods $t$ are connected together by a cross-piece, $u$, hung at its center upon a fulcrum, $v$, by turning which the said rods are made alternately to travel forward from and backward toward the boat, thereby causing the paddle in turn to act against the water, thus propelling the boat or vessel in direct proportion to the amount of power applied to actuate them, the paddles upon their backward stroke being sufficiently turned through the operating devices connected with the upper ends of their rods $d$ as to cause them to offer little resistance to the water and to travel through the same edgewise.

I claim as new and desire to secure by Letters Patent—

The combination, with the actuating-rods $t$ $t$, swinging levers $d$ $d$, and paddles $b$ $b$, of the universal joints $f$, pinion-wheels $g$, and sliding rack-bars $l$, arranged and operating in the manner and for the purpose explained.

The above specification of my invention signed by me this 28th day of March, 1865.

GEORGE MEADER.

Witnesses:
M. M. LIVINGSTON,
C. L. TOPLIFF.